(12) United States Patent
Matthews

(10) Patent No.: US 8,357,425 B2
(45) Date of Patent: Jan. 22, 2013

(54) PROCESS OF MAKING A COATED SUBSTRATE BY CROSSLINKING NANOPARTICLES

(75) Inventor: James Robert Matthews, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1272 days.

(21) Appl. No.: 12/130,174

(22) Filed: May 30, 2008

(65) Prior Publication Data

US 2009/0293949 A1 Dec. 3, 2009

(51) Int. Cl.
*B05D 1/18* (2006.01)
*B05D 1/36* (2006.01)
*B05D 3/12* (2006.01)
*B05D 5/00* (2006.01)
*C23C 16/00* (2006.01)

(52) U.S. Cl. ............ 427/203; 427/248.1; 427/356; 427/427.1; 427/430.1

(58) Field of Classification Search ............ 427/203, 427/248.1, 356, 427.1, 430.1
See application file for complete search history.

(56) References Cited

U.S. PATENT DOCUMENTS

| 5,284,900 | A | 2/1994 | Izubayashi et al. | |
|---|---|---|---|---|
| 7,094,441 | B2 | 8/2006 | Chittibabu et al. | 5/18 |
| 7,255,847 | B2 | 8/2007 | Daoud et al. | 23/47 |
| 7,351,907 | B2 | 4/2008 | Gaudiana et al. | |
| 2002/0190251 | A1 | 12/2002 | Kunitake et al. | 257/43 |
| 2005/0064204 | A1* | 3/2005 | Lalli et al. | 428/428 |
| 2007/0003699 | A1 | 1/2007 | Hosokawa et al. | 3/2 |
| 2007/0218264 | A1 | 9/2007 | Gueneau et al. | 17/23 |
| 2008/0207937 | A1* | 8/2008 | Dawes et al. | 556/465 |
| 2009/0250106 | A1 | 10/2009 | Hayashi et al. | 136/256 |

FOREIGN PATENT DOCUMENTS

| WO | 2004/026783 | 4/2004 | |
|---|---|---|---|
| WO | WO2007/015250 | 2/2007 | 21/2 |
| WO | 2008/001518 | 1/2008 | |

OTHER PUBLICATIONS

Tuncel et al., "Synthesis of Nanowalled Polymer Microtubes Using Glass Fiber Templates", Advanced Functional Materials. 2004, 14, No. 9, September, pp. 851-855.

Zhang et al., "Room-Temperature Synthesis of Porous Nanoparticle $TiO_2$ Films for Flexible Dye-Sensitized Solar Cells", Advanced Functional Materials. 2006, 16, pp. 1228-1234.

O'Regan et al., "A low-cost, high-efficiency solar cell based on dye-sensitized colloidal $TiO_2$ films", Letters to Nature, vol. 353, Oct. 24, 1991, pp. 737-740.

* cited by examiner

*Primary Examiner* — Leo B Tentoni
(74) *Attorney, Agent, or Firm* — Tina N. Thompson

(57) ABSTRACT

Methods for crosslinking nanoparticles and coated substrates made according to the methods are described. The crosslinked nanoparticles on substrates can be used in electrochromic devices and/or photovoltaic devices.

16 Claims, 2 Drawing Sheets

PROCESS OF MAKING A COATED SUBSTRATE BY CROSSLINKING NANOPARTICLES

BACKGROUND

1. Field

Embodiments of the invention relate to methods for crosslinking nanoparticles and coated substrates made according to the methods. Crosslinked nanoparticles on substrates can be used in electrochromic devices and/or photovoltaic devices.

2. Technical Background

Forming layers of particles, for example, nanoparticles that adhere to each other and/or to a substrate is useful for several applications such as in the production of photovoltaic devices such as solar cells. In some conventional solar cell applications, inorganic oxide particle layers are formed, which are subsequently sintered, or otherwise caused to stick together and to the substrate. Typically a high temperature sintering or a pseudo-sintering process is used to form a porous layer of the particles.

Some particles such as anatase titania cannot be fully sintered without the titania changing phase from anatase to rutile at high temperatures, for example, temperatures of 915° C. or above. Thus, anatase titania is usually pseudo-sintered, below its melting point, in order to minimize this phase change, since it can cause a reduction in surface area of the titania. However, conventional pseudo-sintering methods utilize relatively high temperatures, for example, temperatures greater than 300° C. or 450° C.

Temperatures greater than 300° C. or 450° C. can render pseudo-sintering incompatible with many substrate materials, for example, organic substrates, since the elevated temperatures can cause degradation in the organic substrates.

It would be advantageous to have a method for crosslinking nanoparticles at low temperatures (below 300° C.), which is compatible with nanoparticles and/or substrates not able to withstand high temperatures, and/or capable of using crosslinkers having an increased reactivity.

SUMMARY

One embodiment of the invention is a method comprising providing a substrate coated with nanoparticles, applying a nonpolymeric crosslinker to the coating of nanoparticles, and reacting the nonpolymeric crosslinker with the nanoparticles.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

DETAILED DESCRIPTION

Figure 1:
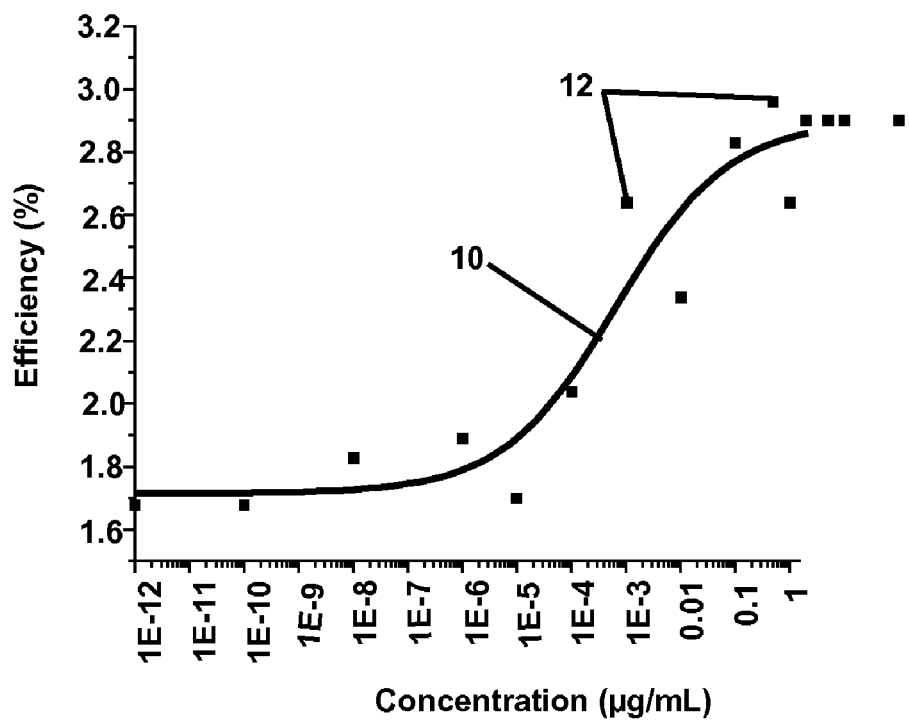
FIG. 1 is a graph of titania/Ru535 dye based photovoltaic cell efficiency for different titanium tetraethoxide crosslinker concentrations.

Reference will now be made in detail to various embodiments of the invention. Wherever possible, the same reference numbers will be used throughout the drawings to refer to the same or like features.

One embodiment of the invention is a method comprising providing a substrate coated with nanoparticles, applying a nonpolymeric crosslinker to the coating of nanoparticles, and reacting the nonpolymeric crosslinker with the nanoparticles.

The nonpolymeric crosslinker, according to some embodiments, comprises titanium tetraethoxide, a bis-silane, an asymmetric bis-silane, titanium isopropoxide, tungsten(VI) ethoxide, tetramethylorthosilicate, or combinations thereof. The nanoparticles, according to some embodiments, are selected from a metal oxide, titania, tungsten(VI) oxide, and combinations thereof. The substrate can be selected from a conductive substrate, a substrate coated with a conductive film, an organic substrate, a polymer, a glass, a glass coated with fluorine doped tin oxide, and combinations thereof.

The method can further comprise heating the nonpolymeric crosslinker after it is applied to the substrate coated with nanoparticles. The nonpolymeric crosslinker can be heated to accelerate the reaction rate of the crosslinker. The temperature can be adjusted according to the temperatures which the materials of each of the individual components (i.e. the nonpolymeric crosslinker, the substrate coated with nanoparticles) can withstand without degradation.

According to some embodiments, applying the nonpolymeric crosslinker comprises spraying, dipping, doctor blading, vapor deposition, or combinations thereof.

In one embodiment, the substrate coated with nanoparticles is provided by providing a suspension comprising nanoparticles and a carrier; and applying the suspension to a substrate. Applying the suspension can comprise spraying, dipping, doctor blading, vapor deposition, or combinations thereof.

The carrier, in one embodiment, is selected from an alcohol, water, and combinations thereof. The carrier can be a volatile solvent such as water or an alcohol such as ethanol or combinations thereof.

According to one embodiment, the method further comprises removing the carrier after applying the suspension. The carrier can be removed by exposing the substrate coated with nanoparticles to a temperature of 250° C. or less, for example, 100° C. or less.

The method, according to one embodiment, further comprises contacting the substrate coated with nanoparticles with an electrolyte after reacting the nonpolymeric crosslinker. The electrolyte can comprise lithium triflate, methoxypropionitrile, N-methyl-oxazolidinone, an iodide, iodine, an iodide/iodine mixture, or combinations thereof.

The method, according to one embodiment, further comprises applying a photosensitive material after reacting the nonpolymeric crosslinker. The photosensitive material can be selected from a dye, a pigment, ruthenium polypyridine, a ruthenium metalorganic and combinations thereof.

In some embodiments, the method further comprises contacting the photosensitive material with an electrolyte. The electrolyte can comprise lithium triflate, methoxypropionitrile, N-methyl-oxazolidinone, an iodide, iodine, an iodide/iodine mixture, or combinations thereof.

The methods described by the invention can be used to make a coated substrate.

According to one embodiment, a photovoltaic device comprises the coated substrate which can be for instance the coated substrate produced after reacting the crosslinker, the coated substrate produced after contacting the substrate coated with nanoparticles with an electrolyte, the coated substrate produced after applying the photosensitive material, and/or the coated substrate produced after contacting the substrate coated with nanoparticles and the photosensitive material with an electrolyte.

In another embodiment, an electrochromic device comprises the coated substrate which can be for instance the coated substrate produced after reacting the crosslinker, the coated substrate produced after contacting the substrate coated with nanoparticles with an electrolyte, the coated substrate produced after applying the photosensitive material, and/or the coated substrate produced after contacting the substrate coated with nanoparticles and the photosensitive material with an electrolyte.

Crosslinkers, for example, reactive chemical compounds can be capable of reaction with nucleophilic surface reaction sites on the surfaces of the nanoparticles and/or the substrates. The crosslinkers can react with the nanoparticles to form one or more thin films of nanoparticles.

In some embodiments, the nanoparticles can be bonded to each other and to a substrate by virtue of their reaction with a multivalent reactive chemical in the crosslinker. The films of nanoparticles can be made at low temperatures, and the nanoparticles can be held together in a three-dimensional structure without the need to thermally sinter them. The formation of nanoparticles on substrates such as organic substrates such as polymers, which are typically incompatible with the temperatures needed for sintering, is thus possible.

A photovoltaic device, fabricated from a thin layer of semiconductor metal oxide (e.g. titania) particles made with a nonpolymeric crosslinker at low temperatures (relative to those temperatures currently used for particle adhesion), can be made which delivers enhanced photo efficiency by virtue of the proximal contact of the particles.

An electrochromic device, fabricated from a thin layer of semiconductor metal oxide, for example, tungsten(VI)oxide particles made with one of the members of the aforementioned class of reactive chemicals at low temperatures (<120° C.). If using tungsten(VI)oxide, this porous film would not be formable by sintering due to the temperatures at which tungsten oxide undergoes phase transitions, with concomitant growth in particle size and therefore reduction in surface area.

EXAMPLES

A suspension of titania nanoparticles in a carrier comprising a mixture of water and N-Methylpyrrolidone (NMP) was made. An aliquot of the suspension was placed on a fluorinated tin oxide coated glass substrate and spread into a thin (approximately 37 microns (μm)) film using a doctor blade. The film was allowed to dry by evaporation of the carrier used to suspend the titania nanoparticles. The fluorinated tin oxide coated glass substrate coated with titania nanoparticles was then immersed in a nonpolymeric crosslinker comprising titanium tetraethoxide (1 microgram per milliliter (μg/mL) NMP) for approximately one minute, and then removed. The substrate coated with titania nanoparticles and nonpolymeric crosslinker was rinsed with NMP and subsequently heated to 100° C. for 30 minutes.

The reaction of the titanium tetraethoxide with the titania nanoparticles can be accelerated using heat, and the heat aids in the removal of residual solvent and the ethanol by-product of the reaction. The reaction of the titanium ethoxide groups can cause the nanoparticles to become crosslinked and to become linked to the substrate, such that the integrity of the resulting thin film remains without the need to sinter the nanoparticles or to exceed the temperatures that organic materials may comfortably survive unharmed.

The length of time in the crosslinker solution and the concentration of the crosslinker solution can be optimized. On one hand, a longer time in the crosslinker solution can facilitate the reaction of more titanium tetraethoxide from the crosslinker solution with the nanoparticles in the film. Up to a certain point it is anticipated that this can increase film strength. However, over reaction can lead to a point where free hydroxyl groups for crosslinking of nanoparticles become scarce and the film strength is compromised by an inability to crosslink.

Exposure to atmospheric water may also have an impact on the degree of crosslinking achieved by a certain dip time and crosslinker concentration. The availability of free surface hydroxyls or other nucleophilic groups may also affect the binding of dyes in photovoltaic devices such as dye-sensitized solar cells and other potential dye related uses.

FIG. 1 is a graph of titania/Ru535 dye based photovoltaic cell efficiency for different titanium tetraethoxide (Ti(OEt)$_4$) crosslinker concentrations. The cell efficiency can be defined as the ratio of the maximum power output to the power of the incident light.

Line 10 and individual data points 12, in FIG. 1, show the effect of nonpolymeric crosslinker concentration on cell performance when a one minute dip time was used. The concentration of the nonpolymeric crosslinker was varied from 1 μg/mL of Ti(OEt)$_4$ in NMP down to 1 attogram per milliliter (ag/mL). There is a transition across the concentration range from $10^{-3}$ to $10^{-4}$ (1 to 0.1 nanogram per milliliter (ng/mL)). The lowest concentration used, (1 ag/mL), corresponds to 1 molecule of nonpolymeric crosslinker to approximately 100 million titania nanoparticles in the film. This is assuming all the crosslinker molecules in the solution enter the film. Repeating the procedure with zero crosslinker concentration produced cells with efficiencies similar to those produced using the very low crosslinker concentration dips. This baseline efficiency is exceeded by using an increased concentration of the nonpolymeric crosslinker such as titanium tetraethoxide.

Once reacted, the titania nanoparticle films, which are often porous, on the substrates can be dyed using an appropriate dye such as Ru535. The dye coated substrates can be placed in contact with an electrolyte and subsequently be used in a photovoltaic device, for example, a dye-sensitized solar cell or in an electrochromic device, for example, an electrochromic window.

Figure 2:
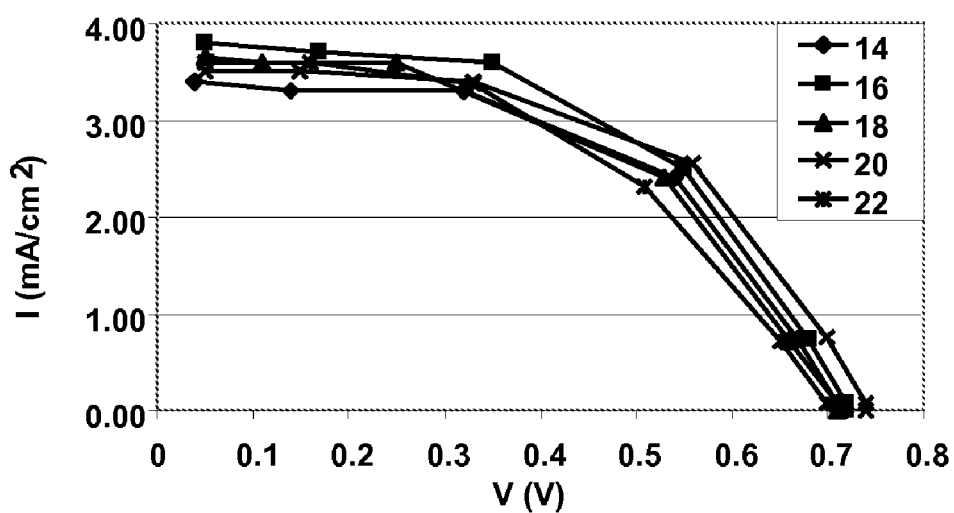
FIG. 2 is of a graph and table of titania/Ru535 dye based photovoltaic cell performance and efficiency for different dipping times in the titanium tetraethoxide dipping solution.

FIG. 2 shows the data for cells made using varying dipping times in a 1 μg/mL titanium tetraethoxide crosslinker solution. Line 14 shows the efficiency of a cell made using a coated substrate made using a five second dip time in the crosslinker. Line 16 shows the efficiency of a cell made using a coated substrate made using a thirty second dip time in the crosslinker. Line 18 shows the efficiency of a cell made using a coated substrate made using a sixty second dip time in the crosslinker. Line 20 shows the efficiency of a cell made using a coated substrate made using a one hundred twenty second dip time in the crosslinker. Line 22 shows the efficiency of a cell made using a coated substrate made using a three hundred second dip time in the crosslinker.

As shown in FIG. 2, the time in the nonpolymeric crosslinker has little effect on the performance of the cell. The absolute values of the efficiency can be affected by different conditions of production, such as slurry solvent, and/or film thickness.

In another example, tungsten oxide film electrochromic cells were made according to the invention. The tungsten(VI) oxide may be slurried in any appropriate solvent mixture. As an example, pale yellow/brown colored tungsten oxide was slurried in water, cast into a film on a sheet of FTO coated sodalime glass, then dried. This film was subsequently dipped into a titanium tetraethoxide crosslinker (1 μg/mL in NMP) then rinsed, dried and cured for 30 min at 100° C. These films were then made into electrochromic cells with FTO on glass for both electrodes and Lithium triflate in 1:1 methoxyacetonitrile:N-methyl-oxazolidinone as the electrolyte.

The electrochromic cells were cycled through different colored states. The cells began as a pale yellow. The application of two volts of direct current (DC) gave rise to a color change to blue. Two volts is slightly larger than the potential necessary for the redox process to take place. However, the greater voltage may encourage faster color switching.

Electrochromic cells were made from coated substrates made using tungsten(VI)oxide coated substrates dipped in tungsten(VI)ethoxide crosslinker with similar performance as the above described electrochromic cells.

Figure 3:
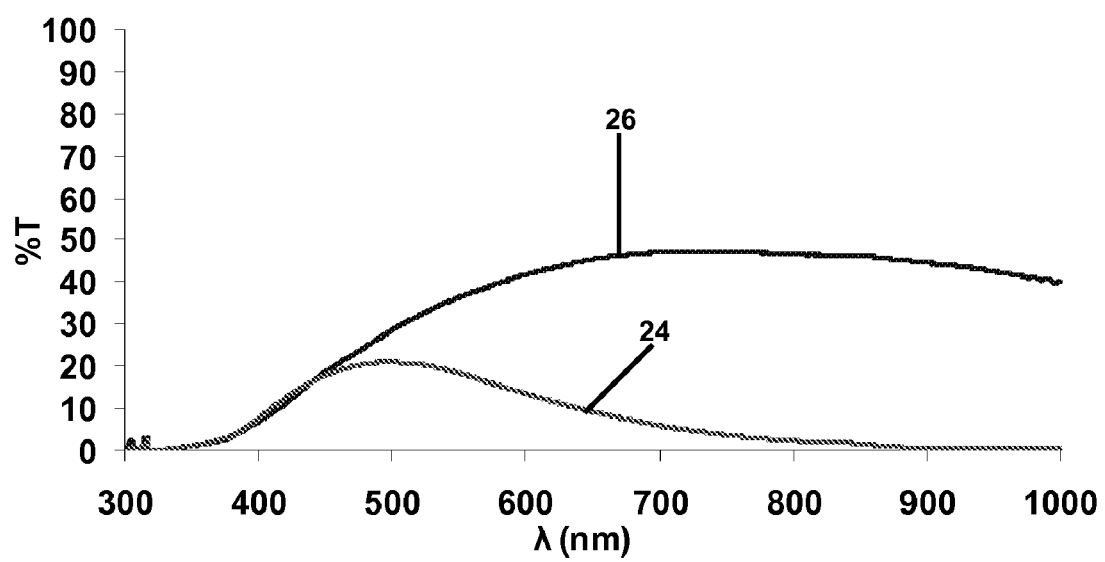
FIG. 3 is a graph of the transmission spectra of the clear and blue states of an electrochromic cell made from tungsten oxide nanoparticles and a tungsten ethoxide dip, with lithium triflate based electrolyte.

The methods, according to the invention, have been used to thin porous tungsten oxide films which are approximately 1 μm thick. These films are thin enough to be translucent. Though not totally transparent, a newspaper can easily be read through them when clear. They change to a deep blue on application of two volts of DC. FIG. 3 shows the UV-visible transmission spectra of one of these cells in the "on" states shown by line 24 and the "off" states shown by line 26.

Investigation of the use of repeated dipping, also with a 1 μg/mL titanium tetraethoxide crosslinker, with curing between dips, was carried out to see if this might improve the robustness of the films. However, repeated dipping caused a reduction in performance rather than an increase.

The ability to bond particles together in close proximity can enable a transition from discrete particle properties to continuous film properties. In particular, a nanocrystalline titania film, made according to the invention, has been shown to perform as a high surface area wide band gap semiconductor. In a photovoltaic device such as a dye sensitized solar cell, such a film can accept electrons injected from an organic dye sensitizer, and conduct them to a transparent conducting oxide surface (e.g. fluorinated tin oxide), from which electrical energy can be harvested. The titania should be in sufficient contact so that electrons generated on an outer particle are transported to proximal particles sequentially until the electron reaches the transparent conducting oxide layer. According to the invention, this can be done without the need for sintering at high temperatures, for example, temperatures greater than 300° C., in the case of titania closer to 500° C. This can enable the selection of low cost substrates, e.g. polymers, low temperature glasses etc.

In addition to facilitating the use of otherwise incompatible solvents in the slurry, the methods of the invention can have the advantage that less material (both nanoparticles and reactive chemicals) are wasted as slurry material can be kept and reused without reaction of the nanoparticles with the reagents such as the nonpolymeric crosslinker.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A method comprising:
   providing a substrate coated with nanoparticles;
   applying a nonpolymeric crosslinker to the coating of nanoparticles; and
   reacting the nonpolymeric crosslinker with the nanoparticles, such that the nanoparticles are bonded to each other and to the substrate by a reaction with the nonpolymeric crosslinker.

2. The method according to claim 1, further comprising contacting the substrate coated with nanoparticles with an electrolyte after reacting the nonpolymeric crosslinker.

3. The method according to claim 1, wherein the substrate coated with nanoparticles is provided by providing a suspension comprising nanoparticles and a carrier; and applying the suspension to a substrate.

4. The method according to claim 3, wherein applying the suspension comprises spraying, dipping, doctor blading, vapor deposition, or combinations thereof.

5. The method according to claim 3, wherein applying the nonpolymeric crosslinker comprises spraying, dipping, doctor blading, vapor deposition, or combinations thereof.

6. The method according to claim 3, further comprising removing the carrier after applying the suspension.

7. The method according to claim 6, wherein the carrier is removed by exposing the substrate coated with nanoparticles to a temperature of 250° C. or less.

8. The method according to claim 3, wherein the carrier is selected from an alcohol, water, and combinations thereof.

9. The method according to claim 3, further comprising applying a photosensitive material after reacting the nonpolymeric crosslinker.

10. The method according to claim 9, wherein the photosensitive material is selected from a dye, a pigment, ruthenium polypyridine, a ruthenium metalorganic and combinations thereof.

11. The method according to claim 9, further comprising contacting the photosensitive material with an electrolyte.

12. The method according to claim 11, wherein the electrolyte comprises lithium triflate, methoxyacetonitrile, N-methyl-oxazolidinone, an iodide, iodine, an iodide/iodine mixture, or combinations thereof.

13. The method according to claim 1, wherein the nonpolymeric crosslinker comprises titanium tetraethoxide, a bissilane, an asymmetric bis-silane, titanium isopropoxide, tungsten(VI) ethoxide, tetramethylorthosilicate, or combinations thereof.

14. The method according to claim 1, wherein the nanoparticles are selected from a metal oxide, titania, tungsten(VI) oxide, and combinations thereof.

15. The method according to claim 1, wherein the substrate is selected from a conductive substrate, a substrate coated with a conductive film, an organic substrate, a polymer, a glass, a glass coated with fluorine doped tin oxide, and combinations thereof.

16. The method according to claim 1, further comprising heating the nonpolymeric crosslinker after it is applied to the substrate coated with nanoparticles.

* * * * *